Sept. 4, 1962  ROSE-MARIE DUNN  3,052,063
PLANT WATERING DEVICE
Filed Dec. 2, 1960

INVENTOR.
Rose-Marie Dunn
BY
Buckhorn, Cheatham & Blore
ATTORNEYS 3,052,063
PLANT WATERING DEVICE
Rose-Marie Dunn, 2310 Bruins Ave., Boise, Idaho
Filed Dec. 2, 1960, Ser. No. 73,423
1 Claim. (Cl. 47—38)

The present invention comprises a self-watering device for potted plants.

The principal object of the present invention is to provide means whereby a potted plant may be left for several weeks without requiring attention. Potted plants usually cannot be left for more than several days without being watered, particularly when they are left in a heated enclosure such as a house. Ordinarily the householder would be required to arrange for someone to enter the house and water the plants at least several times during the ordinary vacation absence, but with the present invention such plants may be left unattended for considerable periods of time.

A further object of the present invention is to provide a device of the foregoing character which may be easily formed of readily available materials and is inexpensive in nature.

Another object of the present invention is to provide means of the foregoing character including a decorative outer casing which may be changed to suit the decor of the room in which the potted plant is placed, said casing comprising an outer ply of fabric and an inner ply of an absorbent material adapted to prevent accumulations of water vapor condensed from the surrounding atmosphere.

The objects and advantages of the invention will be more readily understood by reference to the accompanying drawings wherein like numerals refer to like parts throughout, taken in connection with the accompanying specification. A preferred form of the present invention is illustrated and described in the drawings and specification.

Figure 1:
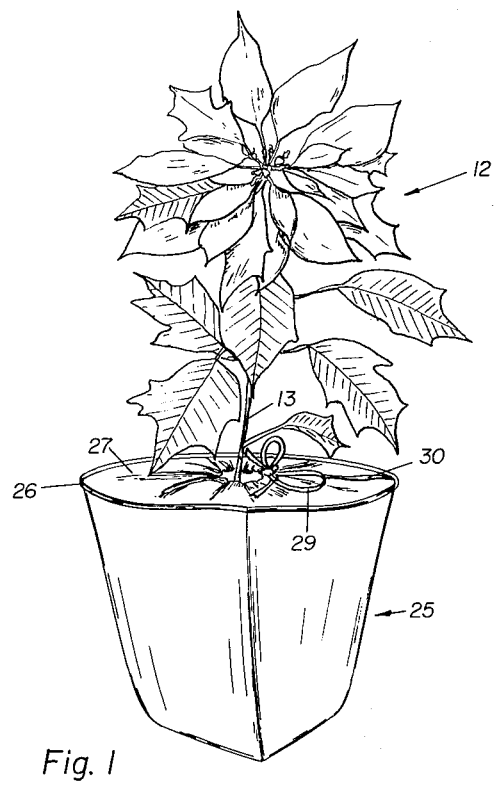
FIG. 1 is a view in perspective of a potted plant in association with the present invention.
Figure 2:
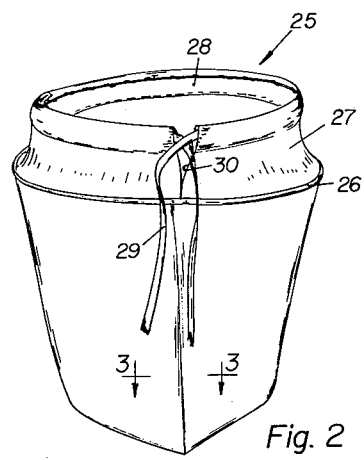
FIG. 2 is a view in perspective of the outer casing of the present invention.
Figure 3:
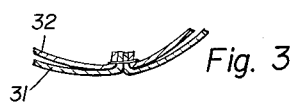
FIG. 3 is a horizontal section taken substantially along line 3—3 of FIG. 2.

The present invention comprises a device for use with a water-impervious pot 10 which may be made of any suitable rigid or substantially rigid material. The pot may be formed of metal, such as sheet steel or aluminum, but is preferably formed of a light, molded plastic. Such devices are readily available as decorative holders for the usual clay pot, but differ therefrom in not having a central drain opening in the bottom and in being absolutely water-impervious. The pot 10 is adapted to enclose soil 11, or other plant growing material normally classified as soil, in which there is growing a plant 12 having a stem 13. It is to be appreciated that a clay pot of the usual type holding a growing plant may be slipped into the pot 10, and such an arrangement is included within the present invention when referring to a pot 10 holding soil and a plant growing therein. Also, the present invention may be utilized in connection with any type of plant, such as those having more than one stem, the term "stem" as used herein referring to the portion of the plant above the soil and substantially at or near the level of the rim 14 of the pot.

An inner waterproof bag 16 is adapted to enclose the pot 10, the bag having cross sectional dimensions slightly larger than and a depth substantially greater than the corresponding dimensions of the pot 10. The bag is formed of water-impervious, flexible but nonstretchable material such as polyethylene sheeting. By the term "nonstretchable" is meant a material which normally retains its dimensions under the stresses to which the bag would be subjected in the intended use, even though localized forces may be applied to such material to distort or stretch it somewhat. A suitable bag may be formed by cutting a piece of the material into the form of a Maltese cross, then adhering the adjacent edges of the arms of the cross together by means of adhesive seams, as indicated at 17. The end edges of the arms of the blank from the mouth of the bag, and drawstring means are provided therein by turning the mouth back and adhering it to the wall of the bag to form a holder for the drawstring 18, the ends of the string projecting through a slit 19 in the material. The relative dimensions of the bag and pot are such that the mouth of the bag may be gathered loosely around the stem of the plant when the pot is enveloped by the bag. When this relationship is achieved there is provided a reservoir 20 surrounding the side of the pot in which a supply of water may be positioned. The water is easily placed in the reservoir by loosening the mouth of the bag and pouring water between the rim of the pot and the wall of the bag.

Wick means 21 preferably comprising a cord of glass fibers is adapted to be placed in the reservoir 20, extending from adjacent the bottom of the pot upwardly over the rim of the pot and into contact with the soil 11. It is to be appreciated that a small supply of water placed in the reservoir 20 will be slowly dissipated, such dissipation being entirely through slow evaporation from the leaves of the plant rather than rapid evaporation from the soil or through the walls of the usual clay pot.

An outer cover is provided comprising a fabric bag 25 having dimensions only slightly larger than the dimensions of the inner bag 16. Such a bag may be conveniently formed by the same method as previously described for the inner bag except that the seams are formed by turning the edges of the cross-arms inwardly and stitching them together. The upper edge of the bag is preferably connected by a rolled seam 26 to an upper collar 27 adapted to lie flat without undue wrinkling, as illustrated in FIG. 1, the inner edge of the collar being provided with a fabric tape 28 stitched thereto and to the body of the collar to provide a holder for a drawstring 29. The collar 27 is slit at 30 from its inner edge to the seam 26 to enable positioning and removal of the outer casing.

The outer casing preferably comprises an outer ply 31 of a decorative fabric which may be selected to suit the room decor. The outer casing also preferably provides an inner ply 32 formed of an absorbent material, such as thin felt or absorbent paper having high wet strength such as used for hospital sheeting or the like. The inner ply 32 need only extend to the seam 26 adjacent the rim of the pot, thereby rendering the collar 27 more flexible and more suitable for the purpose intended. Th two-ply construction diminishes condensation of water vapor from the surrounding atmosphere which may, under certain atmospheric conditions, tend to condense upon the water enclosing portion of the inner bag 16. Furthermore, the absorbent nature of the inner ply tends to spread any such condensed moisture rather than permit it to accumulate and run down the surface of the pot to spoil underlying furniture. The outer fabric 31 is preferably moisture-proofed so that it will not become soiled in use.

Figure 4:
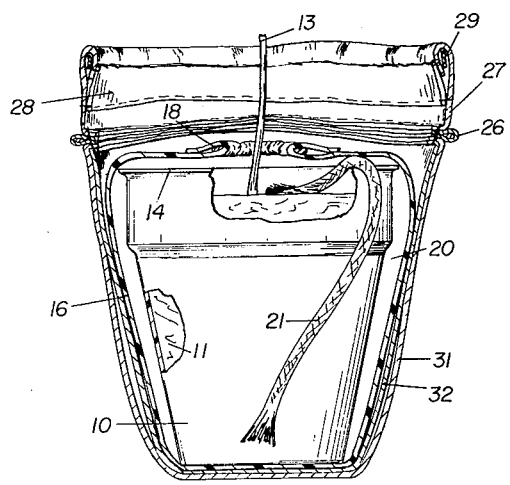
FIG. 4 is a vertical section of the present invention partially assembled around a potted plant, with parts broken away for clarity.
Figure 5:
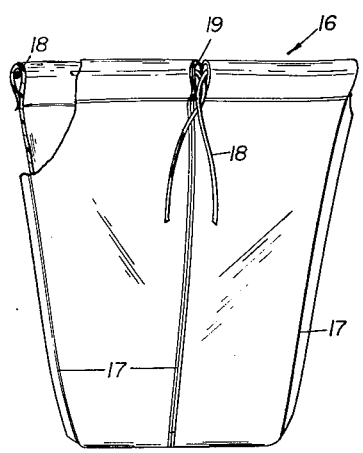
FIG. 5 is a view in elevation of a water-impervious inner bag comprising a portion of the present invention.

The outer bag may be loosened and removed entirely when placing a supply of water in the reservoir 20, or merely drawn open as illustrated in FIG. 4.

Having illustrated and described a preferred embodiment of the invention, it should be apparent to those skilled in the art that the invention permits of modification in arrangement and detail. I claim as my invention all such modifications as come within the true spirit and scope of the appended claim.

I claim:

The combination with a water-impervious pot holding soil and a plant growing therein, of a water-impervious bag enveloping said pot, drawstring means at the mouth of said bag, the relative dimensions of said bag and pot being such that the mouth of the bag may be gathered loosely around the stem of the plant, said bag and pot thereby providing a reservoir for water in surrounding relation to the wall of said pot, wick means extending through said reservoir from adjacent the bottom thereof upwardly into contact with the surface of the soil therein, a casing comprising a fabric bag snugly enclosing said water-impervious bag, said fabric bag comprising drawstring means whereby its mouth may be loosely drawn around the stem of the plant, said fabric bag comprising an outer ply and an inner ply, said inner ply extending around the bottom and wall of the pot up to adjacent the rim thereof and being formed of an absorbent material, said casing acting to diminish accumulations of condensed water vapor from the surrounding atmosphere upon said water-impervious bag.

References Cited in the file of this patent

UNITED STATES PATENTS

| | | |
|---|---|---|
| 669,164 | Guyn | Mar. 5, 1901 |
| 1,464,534 | Lovett | Aug. 14, 1923 |
| 1,994,962 | Rushfeldt | Mar. 19, 1935 |
| 2,072,172 | Lockyer | Mar. 2, 1937 |
| 2,810,235 | Magid | Oct. 22, 1957 |